3,157,501

PRODUCTION OF DYED POLYMERIC IMAGES

Walter F. Burrows, Greene, and Andre K. Schwerin, Binghamton, N.Y., assignors to General Aniline & Film Corporation, New York, N.Y., a corporation of Delaware No Drawing. Filed Sept. 26, 1960, Ser. No. 58,170
12 Claims. (Cl. 96—35)

This invention relates to photopolymerization and, more particularly, to polymerizable compositions and photosensitive layers containing the same for the production of colored polymeric resist images.

It is a primary object of this invention to provide a novel means and method of producing colored polymeric resists.

It is another object to provide a light-sensitive photographic element and a method of making the same, which, on exposure to radiation, followed by development, produces colored polymeric images, the density of which corresponds to the intensity of the absorbed radiation.

Other objects and advantages of the invention will become apparent as the description proceeds.

In accordance with this invention, we coat a suitable support, i.e., a photographic support, with a light-sensitive layer comprising an organic polymerizable vinyl monomer, a photographic colloid carrier, a higher fatty acid, and a ferric salt. The aforesaid light-sensitive element is then exposed to visible light through a pattern or a suitable optical image, the exposed element then developed by contacting with a per compound containing the grouping —O—O— whereby polymerization takes place in those areas of the element which were exposed. In the unexposed portions of the plate, there is no reaction, and the vinyl monomer remains unpolymerized. The residual unpolymerized portions of the coating are removed by washing which leaves intact the polymeric resist image corresponding to the exposed areas. The washed plate is next imbibed or steeped in a solution of a basic dye which has a strong affinity or substantivity for the polymeric image containing the dispersed higher fatty acid.

The so colored polymeric image is extremely stable and there is little or no tendency for the colors to be displaced or washed out.

As examples of the light-sensitive ferric salts which we have found satisfactory for practicing the invention, mention is made of ferric acetate, ferric ammonium acetate, ferric ammonium citrate (brown), ferric ammonium citrate (green), ferric ammonium oxalate, ferric ammonium sulfate, ferric ammonium tartrate, ferric halides such as ferric bromide or ferric chloride, ferric citrate, ferric formate, ferric glycerol phosphate, ferric hydroxide, ferric nitrate, ferric phosphate, ferric potassium citrate, ferric potassium tartrate, ferric pyrophosphate, ferric sodium oxalate, ferric subsulfate, ferric sulfate, ferric succinate and the like.

There are numerous per compounds having the grouping —O—O— described in the chemical literature and which are suitable for carrying out the invention. Representative of these entities are hydrogen peroxide, aliphatic hydroperoxides, i.e., methyl hydroperoxide, ethyl hydroperoxide, t-butyl-hydroperoxide, hexyl hydroperoxide, octyl hydroperoxide, trans-decalinhydroperoxide, 1-methylcyclopentyl hydroperoxide, 1,1-dimethyl-2-propenylhydroperoxide, 2-cyclohexene-1-yl hydroperoxide, cumene hydroperoxide, tetralin hydroperoxide, triphenyl methyl hydroperoxide, etc.; peroxides of the formula ROOR′ wherein R and R′, which may or may not be alike, can be alkyl such as methyl, ethyl, propyl, butyl, pentyl, hexyl, heptyl, octyl, nonyl, decyl, undecyl, etc.; aralkyl, i.e., benzyl, phenethyl, phenylpropyl, naphthylmethyl, naphthylethyl, naphthylpropyl, etc.; aryl such as phenyl, naphthyl, etc.; aliphatic acyl such as acetyl, propionyl, butyryl, valeryl, etc.; aromatic acyl such as benzoyl, naphthoyl, etc.; peroxy acids; i.e., aliphatic peroxy acids, e.g., peracetic acid, perpropionic acid, perbutyric acid, etc.; aromatic peroxy acids, i.e., perbenzoic acid, perphthalic acid, etc.; esters of the aforesaid peroxy acids; salts of peracids such as ammonium persulfate, etc. Such per compounds are well known and their description and preparation can be found in the chemical literature. In this connection, reference is made to such well known works as Organic Peroxides by Arthur V. Tobolsky and Robert B. Mesrobian and published by Interscience Publishers, Inc., New York, and Interscience Publishers Ltd., London (1954).

Any normally liquid to solid polymerizable unsaturated organic compound can be used in practicing the invention. Preferably, such compounds should be ethylenically unsaturated, i.e., contain at least one nonaromatic double bond between adjacent carbon atoms. Compounds of this type are the polymerizable vinyl or vinylidene compounds containing at least one $CH_2{=}C<$ group activated by direct attachment to a negative group such as halogen, $>C{=}O$, $—C{\equiv}N$, $—C{\equiv}C—$, —O—, or aryl. Examples of these include acrylamide, acrylonitrile, N-ethanol acrylamide, methacrylic acid, acrylic acid, calcium acrylate, methacrylamide, vinyl acetate, methylmethacrylate, methylacrylate, ethylacrylate, vinyl benzoate, N-vinyl-2-pyrrolidone, vinylmethyl ether, vinylbutyl ether, vinylisopropyl ether, vinylisobutyl ether, vinylbutyrate, butadiene or mixtures of ethylacrylate with vinyl acetate, acrylonitrile with styrene, butadiene with acrylonitrile, N,N′-methylene-bis-acrylamide, triallyl cyanurate, divinyl benzene, divinyl ketones, diglycol diacrylate and the like.

The above ethylenically unsaturated organic compounds or monomers, as they are sometimes called, may be used either alone or in admixture in order to vary the physical properties such as molecular weight, hardness, etc. of the final polymer. For instance, it is a recognized practice, in order to produce a vinyl polymer having specified properties, to polymerize in the presence of a small amount of an unsaturated compound containing at least two terminal vinyl groups each linked to a carbon atom in a straight chain or in a ring. The function of such compounds is to cross-link the polyvinyl chains. This technique, as used in polymerization, is further described by Kropa and Bradley in vol. 31, No. 12, of Industrial and Engineering Chemistry, 1939.

Among such cross-linking agents for the purpose described herein may be mentioned certain of the monomers listed above, i.e., N,N′-methylene-bis-acrylamide, triallyl cyanurate, divinyl benzene, divinyl ketones and diglycol diacrylate. Generally speaking, increasing the quantity of cross-linking agents increases the hardness of the polymer obtained in the range wherein the ratio of monomer to cross-linking agent varies from 10:1 to 50:1.

The quantity of ferric salts used to initiate polymerization of the monomer or unsaturated organic compound is not critical and may be varied over wide limits. In general, we have found that satisfactory results ensue if the proportion of ferric ion to monomer varies from 1:10,000 to 1:6.

As previous pointed out, we prefer to incorporate the light sensitive ferric salts in a photographic carrier of the type commonly employed in the art, and, in this connection, mention is made of gelatin, polyvinyl alcohol, casein, glue, saponified cellulose acetate, carboxymethyl cellulose, starch, polyvinyl pyrrolidone, and the like.

Any number of supports can be employed for retaining the dyed photographic polymeric resist as described herein. It is only necessary that sufficient adhesion be provided between the support and the polymeric coating. Typical supports for this include cellulose ester supports of both the hydrophobic variety or the type having a surface made hydrophilic by a partial saponification, glass terephthalic acid ester polymers, polystyrene plastic film, metal sheet, cloth, etc.

In selecting a fatty acid, we prefer those which are essentially water-insoluble since these are retained more tenaciously in the polymeric layer. In general, those aliphatic acids of the fatty acid series are suitable which have at least 10 carbon atoms including both saturated and unsaturated types.

As far as we have been able to determine, there is no upper limit as to the number of carbon atoms which the aliphatic acid may have, provided it is essentially water insoluble. We have experimented with fatty acids up to a total of 27 carbon atoms and obtained excellent results. Illustrative of the fatty acids which can be employed in practicing the invention mention is made of capric, undecylic, lauric, tridecoic, myristic, pentadecanoic, palmitic, margaric, stearic, nondecyclic, arachidic, cerotic, etc. The aforementioned list of fatty acids are of the saturated variety. Equally suitable for practicing the invention are the unsaturated acids, which have the added advantage of being liquid at room temperature, even for the higher molecular weight members, as exemplified by oleic, erucic, brassidic and behenic, etc. The dyes which we prefer to employ for coloring the photographic polymeric resists and containing the above dispersed fatty acids are known in the art as basic dyes and are described in the color index of vol. 1, 2nd edition, 1956, (pages 1617–1654) and include: color index basic yellow 1, 2, 4, 10, 11; color index basic orange 14, 22; color index basic red 1, 2, 5, 9, 13; color index basic violet 1, 3, 4, 5, 7, 10, 14; color index basic blue 1, 5, 6, 9, 12; color index basic green 1, 4.

Those who are skilled in the art using the description and benefit of the instant disclosure can ascertain those combinations of monomer, light-sensitive iron compound, peroxide and basic dyes which will yield the best result for any particular application.

In the following examples are illustrated various ramifications and embodiments of our invention, although it is to be understood that the invention is not restricted thereto.

*Example I*

The following compositions were prepared:

(*a*)

| | | |
|---|---|---|
| N,N'-methylene-bis-acrylamide | g | 100 |
| $H_2O$ | ml | 5670 |
| Gelatin | g | 1000 |
| Oleic acid | g | 400 |
| Ferric ammonium citrate (1.0 molar) | ml | 2000 |
| Water | ml | 13250 |

The so-obtained mixture was thoroughly agitated until the oleic acid was intimately dispersed throughout the aqueous medium. The solution was then coated on cellulose triacetate filmbase having a thickness of 200 microns. After drying, the coating was then placed in contact with a photographic negative and exposed for 30 seconds at a distance of 20 inches from the light source which, in this case, was a 375 watt incandescent lamp. The exposed coating was then washed for a few seconds with a 1% hydrogen peroxide solution which caused polymerization of the vinyl monomer in the exposed layers and served to wash away the unexposed and, therefore, unpolymerized monomer. After a final wash-out with warm water, the remaining polymeric photographic resist was dyed with a basic dye of the desired color and spectral range. As previously pointed out, these dyes are described in the color index 1956 edition. After the dyeing was complete, a sharp positive resist was obtained and, because of the affinity between the basic dye and the dispersed higher fatty acid, the dye is firmly embedded or attached to the polymeric image and highly resistant toward displacement

*Example II*

The following composition was prepared:

(*a*)

| | Ml. |
|---|---|
| Gelatin (15% solution by weight) | 25 |
| Sodium octyl sulfate (25%) | 0.5 |

1.0 g. of myristic acid was dissolved in 5.0 g. of a solvent blended of the following components:

(*b*)

| | Percent |
|---|---|
| Tricresyl phosphate | 50 |
| Dibutylphthalate | 40 |
| Phenethyl alcohol | 10 |

(*b*) was thoroughly dispersed in (*a*) by means of vigorous agitation, such as a Waring Blendor. The dispersion of the myristic acid in gelatin was next combined with the following mixture:

| | | |
|---|---|---|
| N,N'-methylene-bis-acrylamide (2% aqueous solution) | ml | 30 |
| Ferric ammonium citrate (1.0 molar) | ml | 5.0 |

The so-obtained composition was coated on a triacetate filmbase, having a thickness of 200 microns. After drying, the coating was exposed in contact with a photographic negative for 30 seconds at a distance of 20 inches from the light source, which was a 375 watt incandescent lamp. After about 10 seconds' treatment with 1% hydrogen peroxide solution, the coating was then washed with warm water, which removed the residual unpolymerized monomer corresponding to the unexposed areas. In the exposed areas there was obtained a tough resinous resist of the polymerized monomer. The resist was then colored with a basic dye of the type previously alluded to and a sharp positive dye resist was obtained.

*Example III*

The procedure of Example I was again carried out, but in this example the oleic acid of the earlier example was replaced by stearic acid. The procedure and result obtained paralleled those of the earlier example.

*Example IV*

The procedure of Example I was repeated except the oleic acid was replaced by brassidic acid. The procedure and results were essentialy identical to those obtained in the first example.

In the event it is desired to produce a dyed resist which is neutral or black, this can readily be accomplished by dyeing the photographic resist with a mixture of dyes, the total adsorption of which spans the visible range of the electromagnetic spectrum. If, for instance, one employs the substractive system of color, it becomes only necessary to use two dyes, the total adsorption of which lies within the visible portion of the spectrum.

The production of colored polymeric resist in the manner described in the instant invention has the advantage that such images can be produced extremely rapidly, because of the high sensitivity of the coatings. This can, in a large measure, be attributed to the fact that it is unnecessary to dye the light-sensitive coating prior to exposure with concomitant reduction in light-sensitivity. Thus, speed and range approaching the slower silver halide emulsion becomes accessible in a non-silver system. This is a valuable asset of our invention and represents a distinct and forward step over the prior art. Aside from only requiring a few seconds' exposure to effect formation of an image, the light-sensitive layers of the invention do not require the exceedingly intense exposure sources as heretoforeused. For instance, in United States Patent 2,787,543, colored polymeric relief images are described which require exposure to a 35 amp. carbon arc, whereas our sensitive compositions can be effectively triggered with an incandescent lamp of low wattage.

Our method of producing colored polymeric images is eminently suitable for reproducing the color aspects of a subject. Thus, we prepare three separate and identical coatings and expose each to a separation negative corresponding to ⅓ of the color aspects of a subject. After exposure and development as described herein, the three so-obtained polymeric photographic images each corresponding to ⅓ of the color aspects of the subject are then dyed with the three appropriate subtractive dyes. The dyed images are then superimposed in exact register and viewed through a white light source, thereby reproducing the original color aspect of the subject. Other valuable uses and application for our color process and materials are in the pre-testing or proofing of half tone color separation originals which are made from color printing plates, e.g., as in the offset letter press or rotogravure in which the dyes used may correspond to the original inks. Moreover, our method of producing color images is valuable in the visual aids field, where various color schematics or diagrams are placed in register.

The ease of which our sensitive materials can be produced, exposed and dyed render them eminently applicable for the aforesaid purpose.

By the use of appropriate stencils, colored polymeric images can be formed on a variety of surfaces such as ceramic or glass, paper, plastic, etc., for purely decorative purposes.

We claim:

1. A photographic element comprising a support having coated thereon a photosensitive layer comprising a photographic colloid carrier having dispersed therein, a normally liquid to solid dispersible monomer containing the grouping $CH_2{=}C{=}$, an essentially water insoluble straight chain carboxylic aliphatic acid having a chain length of from 10 to 27 carbon atoms and a light-sensitive ferric salt.

2. The photographic element according to claim 1 wherein the photographic colloid is gelatin.

3. The photographic element according to claim 1 wherein the aliphatic acid is oleic acid.

4. The photographic element according to claim 1 wherein the aliphatic acid is myristic acid.

5. The photographic element according to claim 1 wherein the ferric compound is ferric ammonium citrate.

6. The method of producing a colored polymeric resist image which comprises exposing to light a photosensitive layer comprising a photographic colloid carrier having dispersed therein, a normally liquid to solid dispersible monomer containing the grouping $CH_2{=}C{=}$, an essentially water insoluble straight chain carboxylic aliphatic acid having a chain length of from 10 to 27 carbon atoms and a light-sensitive ferric salt; developing the exposed layer by contacting it with a per-compound having the grouping —O—O— in order to effect imagewise polymerization in the exposed areas; removing the unpolymerized monomer in the unexposed areas and coloring the residual polymeric resist image in the exposed areas with a solution of a basic dye to form a colored polymeric resist image.

7. The method according to claim 6 wherein the monomer is N,N'-methylene-bis-acrylamide.

8. The method according to claim 6 wherein the photographic colloid is gelatin.

9. The method according to claim 6 wherein the aliphatic acid is oleic acid.

10. The method according to claim 6 wherein the ferric compound is ferric ammonium citrate.

11. The method according to claim 6 wherein aqueous hydrogen peroxide is used to develop the exposed layer and for removing the unpolymerized monomer in the unexposed areas of said layer.

12. The photographic element according to claim 1 wherein the monomer is N,N'-methylene-bis-acrylamide.

References Cited in the file of this patent

UNITED STATES PATENTS

| | | |
|---|---|---|
| 2,344,785 | Owens et al. | Mar. 21, 1944 |
| 2,635,536 | Murray | Apr. 21, 1953 |
| 2,848,296 | Heller | Aug. 19, 1958 |
| 2,864,700 | Chevalier | Dec. 16, 1958 |
| 2,875,047 | Oster | Feb. 24, 1959 |
| 2,927,021 | Sorkin | Mar. 1, 1960 |
| 2,969,731 | Kendall | Jan. 31, 1961 |
| 3,029,145 | Dumers et al. | Apr. 10, 1962 |

FOREIGN PATENTS

| | | |
|---|---|---|
| 810,261 | Great Britain | Mar. 11, 1959 |

OTHER REFERENCES

Canadian Colorist and Textile Processor, January 1925, pages 16 and 17.

Ranshaw: Textile Colorist, July 1942, pages 356–359.

Diserens: "The Chemical Technology of Dyeing and Printing," 1948, Reinhold Publishing Co., N.Y., pages 421—424 and pages 477 and 478.